United States Patent [19]
Tang

[11] Patent Number: 5,138,174
[45] Date of Patent: Aug. 11, 1992

[54] NANOMETER-SCALE STRUCTURES AND LITHOGRAPHY

[75] Inventor: Sau Lan Tang, Hockessin, Del.

[73] Assignee: E. I. du Pont de Nemours and Company, Wilmington, Del.

[21] Appl. No.: 730,406

[22] Filed: Jul. 16, 1991

[51] Int. Cl.$^5$ ............................................. H01J 37/305
[52] U.S. Cl. ............................... 250/492.3; 250/492.2; 430/296; 369/126; 346/158
[58] Field of Search ........................... 250/492.3, 492.2; 430/296; 369/126; 346/158

[56] References Cited

U.S. PATENT DOCUMENTS

| | | | |
|---|---|---|---|
| 4,343,993 | 8/1982 | Binnig et al. | 250/306 |
| 4,785,189 | 11/1988 | Wells | 250/492.2 |
| 4,896,044 | 1/1990 | Li et al. | 250/492.3 |

OTHER PUBLICATIONS

Wichramasinghe, H. K., *Scientific American*, pp. 98–105 (Oct. 1989).
Hansma, P. K. et al., *Science*, 242: 209–216 (1988).
Foster, J. S. et al., *Nature*, 331: 324–326 (Jan. 28, 1988).
Miller, J. A. et al., *J. Appl. Phys.*, 68(2), pp. 905–907 (Jul. 15, 1990).
Albrecht, T. R. et al., *Appl. Phys. Lett.*, 55(17), pp. 1727–1729 (Oct. 23, 1989).
Penner, R. M., Abstracts for STM 1990/Nano I Conference, Jul. 1990.

*Primary Examiner*—Jack I. Berman

[57] ABSTRACT

Improved fabrication processes for preparation of nanometer scale structures wherein a polymeric coating is applied to the substrate prior to fabrication are disclosed.

25 Claims, 4 Drawing Sheets

NANOMETER-SCALE STRUCTURES AND LITHOGRAPHY

FIELD OF THE INVENTION

The present invention relates to an improved fabrication process for the preparation of nanometer-scale structures using a scanning tunneling microscope.

BACKGROUND OF THE INVENTION

The scanning tunneling microscope, hereinafter STM, is an instrument capable of resolving surface detail down to the atomic level. The microscope's conductive tip, ideally terminating in a single atom, traces the contours of a surface with atomic resolution. The tip is maneuvered to within a nanometer or so of the surface of a conducting substrate so that the electron clouds of the atom at the probe tip overlap that of the nearest atom of the sample. When a small voltage is applied, electrons tunnel across the gap between the microscope tip and the substrate, generating a tunneling current the magnitude of which is sensitive to the size of the gap. Typically the tunneling current decreases by a factor of 10 each time the gap is widened by 0.1 nanometer.

Movement of the microscope tip is controlled by piezoelectric controls. In one mode of operation, the tip or probe is held at a constant height as it is moved horizontally back and forth across the sample surface in a raster pattern, its parallel tracks separated by a fraction of a nanometer. This causes the tunneling current to fluctuate and the current variation is measured and translated into an image of the surface. The current increases when the tip is closer to the surface, as when passing over bumps such as a surface atom, and decreases when the tip is farther from the surface, as when passing over gaps between atoms. In an alternative mode of operation, the probe or tip moves up and down in concert with the surface topography as it is moved across the surface in a raster pattern. Its height is controlled to maintain a constant tunneling current between the tip and the surface. The variations in voltage required to maintain this constant gap are electronically translated into an image of surface relief.

The image obtained by either mode of operation is not necessarily a topographical map of the surface, but a surface of constant tunneling probability affected by the variations in the occurrence and energy levels of the electrons present in the surface atoms. If the surface is composed of a single type of atom, the image may closely resemble topography, but when various atoms are present pits or bumps will appear in the image depending upon their electronic structures.

Further detail on the structure and operation of the STM is disclosed in the Binnig et al. U.S. Pat. No. 4,343,993 of issued Aug. 10, 1982; Wickramasinghe, H. K., *Scientific American*, 98–105, October (1989); and Hansma et al., *Science*, 242, 209–216, Oct. 14, 1988.

The STM is useful not only for the imaging or characterization of surfaces, but also for manipulating surfaces at the subnanometer scale. Lithography using STM for nanoscale structure fabrication is of interest in the area of electronics for information storage bits, nanoelectronic circuit elements, and other applications in microelectronics. The ability to manipulate single atoms or molecules with the STM provides many unique potential applications in microelectronics.

Various approaches have been explored in the use of STM for etching or writing. Since STM is limited to imaging or manipulating surfaces which conduct electrons, thin conductive coatings or replicas have been used on substrate surfaces which are nonconducting. Metal deposition onto a substrate surface from a gas is another method which has been used to pattern lines using the STM. Deposition of particles onto the surface from a carrier has also been used. The formation of protrusions or raised surface areas on metallic glasses by local heating is another STM writing technique. Writing using the STM wherein the microscope tip physically touches, scratches, indents or creates holes in the substrate surface is also known. The tunneling current has also been used for surface rearrangement of atoms already present.

One popular method for generating nanometer scale structures with the STM involves using a short voltage pulse of nanoseconds to microseconds duration and a few volts in amplitude. Variations of such methods can be found in the published literature such as Forster et al., *Nature*, 133, p. 324, Jan. 28, 1988 and Miller et al., *J. Appl Phys.*, 68, p. 905 (1990).

It is known that such nanometer scale structures can be made under water as described by Penner et al., Abstracts for STM 1990/Nano I Conference, July 1990. Such structures have also been made in a previously evacuated chamber partially filled with water vapor as disclosed by Albrecht et al., *Appl Phys. Lett.*, 55, p. 1727, (1989).

However there are still problems with the methodology. In some operating environments the conditions of the voltage pulse for making the structures seem to change slightly after each pulse. Typically the voltage amplitude has to be turned up one or two tenths of a volt after each pulse, thus making automation difficult. Also the reliability of the fabrication process appears to be deficient. Using identical procedures for the voltage pulse and substrate preparation, the size of the structures can change drastically. It can be impossible to predict whether a structure will appear.

It is therefore an object of the present invention to provide an improved process for nanometer scale fabrication using STM.

It is a further object of the present invention to provide a process for etching or writing which is reliably reproducible.

It is a further object of the present invention to provide a reproducible fabrication process by which structures of less than 10 nanometers can easily be prepared.

It is a further object of the present invention to provide a process for retaining moisture in a substrate of the type for nanometer scale fabrication in a vacuum.

SUMMARY OF THE INVENTION

Figure 1:
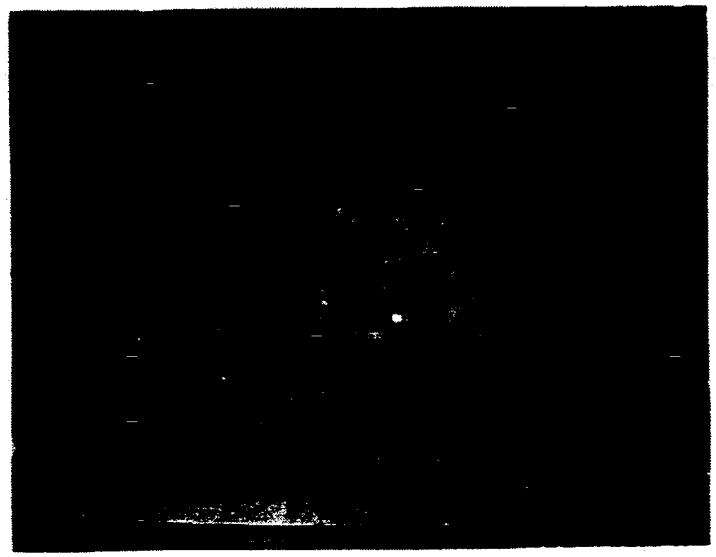
FIG. 1 depicts an etching of the letter "D" which is 10 nm by 6 nm in size written in Example 1 using a STM and the process of the present invention.
Figure 2:
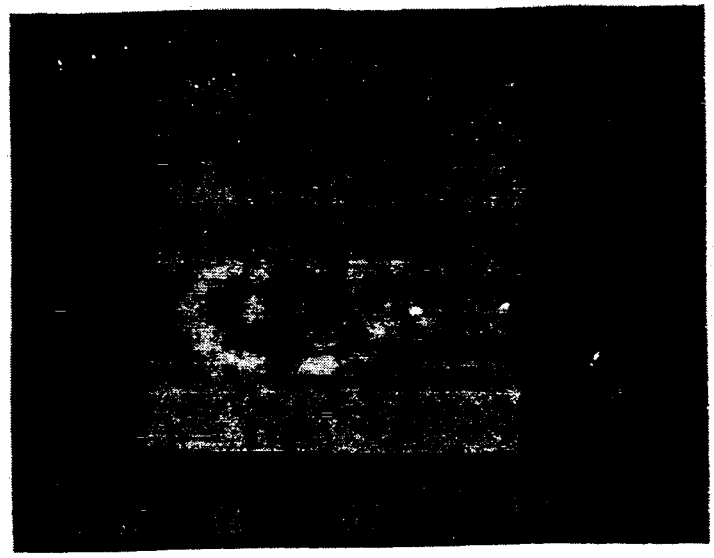
FIG. 2 depicts an etching of the letter "U" which is 15 nm by 5 nm in size written in Example 1 using a STM and the process of the present invention.
Figure 3:
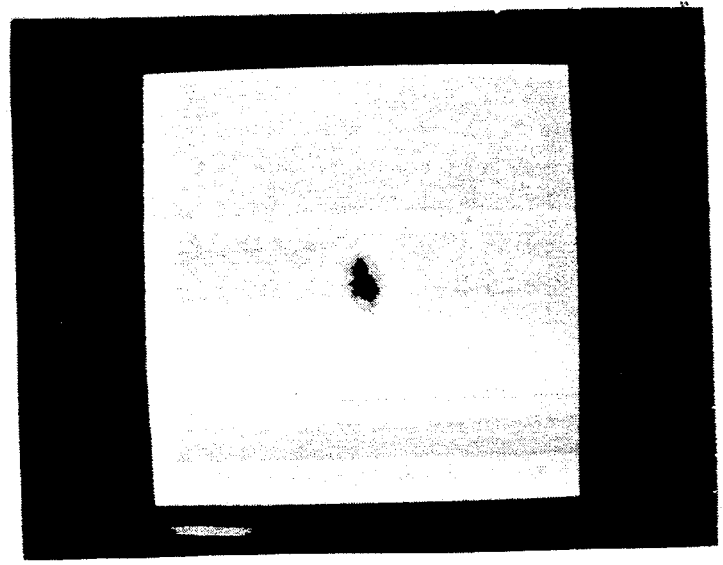
FIG. 3 depicts the dot structure of about 5 nm in diameter generated in Example 7.
Figure 4:
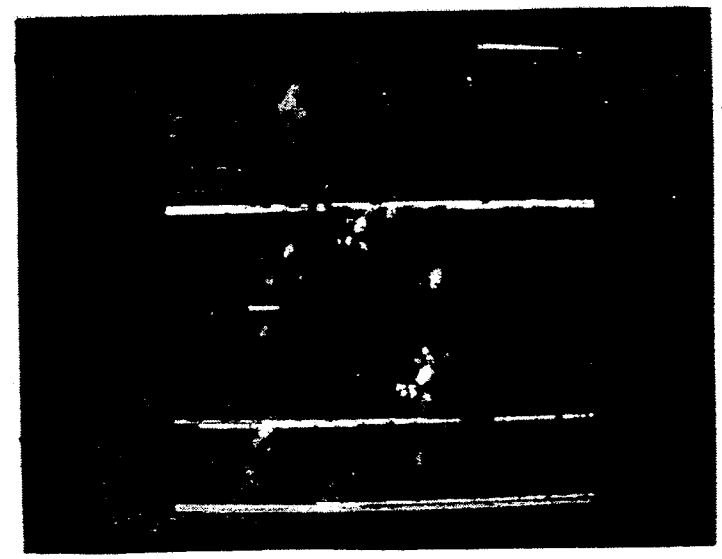
FIG. 4 depicts an etching of the letter "O" which is about 60 nm to 120 nm in diameter on thicker areas of the coating written in Example 7.
Figure 5:
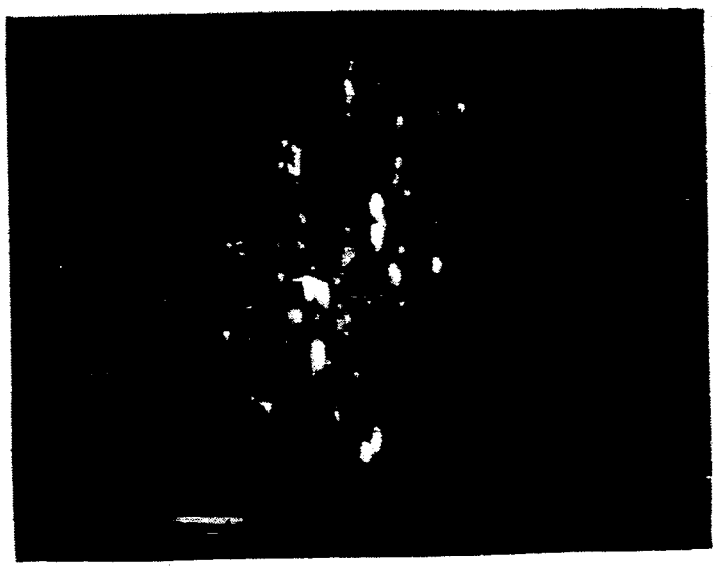
FIG. 5 depicts an individual dot structure from the letter "O" of FIG. 4 of about 20 nm to 40 nm in size generated in Example 7 on thicker areas of the polymer coating.

The present invention provides an improved process for nanometer scale structure fabrication using a technique involving application of a voltage pulse between a sharp tip or stylus and a conducting or semiconducting substrate wherein the improvement comprises 1) depositing a nominally nonconducting polymer coating on the surface of a conducting or semiconducting substrate, 2) allowing the moisture level of the polymer coating and the substrate to equilibrate with an enclosed atmosphere surrounding the tip and the substrate, and 3) ascertaining that equilibration is achieved by monitoring pulsing conditions to determine when said conditions become constant, prior to commencing fabrication of a structure on the substrate.

The present invention further comprises an improved process for nanometer scale structure fabrication using a technique involving application of a voltage pulse between a sharp tip or stylus and a conducting or semiconducting substrate wherein the improvement comprises:

1) dipping a conducting or semiconducting substrate into a solution of a rigid rod polymer to deposit a coating of the polymer on the substrate, 2) allowing the moisture level of the coated substrate to equilibrate with an enclosed atmosphere surrounding the tip and the coated substrate, 3) ascertaining that equilibration is achieved by monitoring pulsing conditions to determine when such conditions become constant, and 4) applying a voltage pulse to the coated substrate to form a nanometer scale structure.

The present invention further comprises an improved process for nanometer scale structure fabrication using a technique involving application of a voltage pulse or current between a sharp tip or stylus and a conducting or semiconducting substrate wherein the improvement comprises:

1) dipping a conducting or semiconducting substrate into a solution of a rigid rod polymer to deposit a coating of molecularly flat layers of the polymer on the substrate, and 2) applying an increased tunneling current compared to an imaging current to the coated substrate to form a nanometer scale structure.

The present invention further comprises a process for retaining moisture in a substrate in a vacuum comprising coating the substrate with a water-soluble polymer by depositing said polymer on the surface of the substrate and subjecting the coated substrate to a vacuum.

DETAILED DESCRIPTION OF THE INVENTION

Elaborate patterns at a nanometer scale of less than 10 nm, often about 0.4 to 3 nm, in width or diameter can be created using the improved fabrication process of the present invention with STM.

The term "etching" or "fabricating" as used herein means the purposeful ablation or modification of a substrate surface or polymer coating one or more atoms at a time.

The term "structure" as used herein means an individual hole or mound resulting from etching of a substrate. Several structures can be used to create a pattern in the substrate.

The term "pattern" or "fabrication" as used herein means the etched image, figures, letters, words or drawings written by the process of the present invention.

The term "STM" as used herein means a scanning tunneling microscope.

The present invention provides a controlled process for structure fabrication accurate to the nanometer scale. The control of the process is implemented through a layer of coating material deposited upon the substrate surface to be written upon. The coating material alters and regulates the electrical and electro-chemical properties and the humidity level of the tunneling or writing environment between the tip and the substrate. The resulting structures reside either in the deposited layer itself, or in the substrate covered by the layer. Structures generated are more consistent in shape and dimension, facilitating the patterning of structures for applications such as ultra-high density information storage and nanometer scale electronic circuitry.

It has been found that the level of humidity is important in nanometer structure fabrication. Fluctuation of the humidity level of the writing tip environment makes the structure fabrication procedure unacceptably erratic. Coating the substrate with materials that absorb and retain water stabilizes the writing tip environment. The high water content of the coating material appears to focus the transient current during the duration of the voltage pulse onto a nanometer scale area of the substrate. For polymers that are not water soluble a humidity level of at least about 40% at room temperature (about 25° C.) is needed to obtain the desired process control. Preferably a humidity level of about 60% at room temperature (about 25° C.) is maintained at the tip environment. For water soluble polymers, the humidity level of the environment can be as low as $10^{-9}$ torr partial pressure of water vapor.

In the process of the present invention a polymer coating is deposited upon the surface of a conducting or semiconducting substrate to be written or etched upon. The coating thickness may be, but is not necessarily, a single monolayer. Such a coating can be deposited using the Langmuir-Blodgett technique. For details of this technique see, for example, Sugi, *J. Mol. Electron.*, Vol. 1, P. 3, (1985), which is herein incorporated by reference. Molecular beam epitaxy can also be used to prepare layered structures for use in the process of the present invention. It allows atomic or molecular layer by layer deposition in a two dimensional growth process resulting in formation of materials of multiple or alternating thin layers of composition, each only a few atomic layers in thickness. For details of this technique see, for example, Ploog, *Angewandte Chemie*, Int'l Ed. in English, 27, 5, 593-758, May (1988), which is herein incorporated by reference. Such multilayered materials are suitable for use herein as long as the top layer is a coating as defined hereinafter, the one or more layers immediately under the coating comprise an etchable substrate, and the coating thickness does not impair tunneling current. Other techniques such as spin-coating, spray-coating, or adding liquid dropwise can also be used to deposit the coating on the substrate. Rigid rod polymers that self-assemble into ordered layers, such as hydroxypropylcellulose, are also suitable for forming coatings in the present invention. A thin even coating of a maximum of about 100 nm is preferred.

Water is incorporated into the coating if needed by exposing it to high humidity in a controlled atmosphere enclosing the coated substrate and writing tip or stylus. This can be achieved by simply placing an open container of water within the enclosed environment. Various levels of humidity can be employed in the enclosed environment so long as the humidity is high enough to maintain an adequate moisture level in the coating. The time required for equilibration of the moisture level of the coating and the enclosed atmosphere will vary accordingly.

It can be determined when equilibration of the moisture level of the coated substrate and the surrounding enclosed atmosphere has been achieved by monitoring of the pulsing conditions. At equilibrium the voltage pulse height and width needed to create a nanostructure of consistent size become essentially constant from pulse to pulse. When such conditions become constant, the fabrication of the desired structure can be commenced.

Suitable for use as coatings herein are polymers that are water-soluble, absorb water efficiently, or that have high water vapor permeability and can be deposited as thin films on the substrate to be written upon. Examples of such water soluble polymers include, but are not limited to, polyvinyl alcohol, hydroxypropylcellulose, hydroxypropylmethylcellulose, hydroxypropylethylcellulose, polyacrylic acid, polyacrylic acid-co-2-vinylpyridine, poly(1-butylene oxide-co-ethylene oxide), polyethylene oxide, poly(ethylene oxide-co-propylene oxide), poly(ethylene oxide-co-styrene oxide), poly(maleic acid-co-vinyl acetate), polymethacrylic acid, poly(methacrylic acid-co-methyl acrylate), poly(methacrylic acid-co-vinyl diethylaminoethyl ether), poly(methacrylic acid-co-2-vinylpyridine), poly(methacrylic acid-co-4-vinylpyridine), polypropylene oxide, poly(styrene-co-4-vinyl-N-butylpyridinium bromide), poly(vinyl-co-vinyl alcohol), poly(vinyl acetate-co-vinyl pyrrolidone), poly(4-vinylbenzoic acid), poly(vinylbenzoic acid-co-2-vinylpyridine), poly(vinyl methyl ether), polyvinylpyrrolidone, poly(2-vinylpyridine), poly(4-vinylpyridine), or polysucrose.

Additional examples of suitable polymers for use in the present invention include, but are not limited to, fluorocarbon polymers, polyalkyl alcohols, cyanoethyl polymers, polysilanes such as poly(oxydimethylsilane), polydienes such as poly(1,3-butadiene), celluloses such as regenerated cellulose, ethyl cellulose, cellulose nitrate, cellulose acetate, or cellulose triacetate, acrylic, polystyrene, polyurethane, Teflon ®, Kevlar ®, Thiokol PRI ®, Thiokol ST ®, or Thiokol Type FA ®.

Substrates suitable for use in the process of the present invention include any substrate upon which structures can be formed with transient tip bias voltage or current as known in the art. Examples include, but are not limited to, highly oriented pyrolitic graphite, gold, metallic glass, superconductors, magnetic media, metal chalcogenides such as InSe, $ZrS_2$, $TiSe_2$, $SnSe_2$, $SnS_2$, $NbSe_2$, $TaS_2$, $MoSe_2$, or $WSe_2$, or phase change materials such as GeTe, $Sb_2Te_3$, GaSb, $Sb_2Se$, SnTe, PbTe, SbSe, BiSe, GeSe and the like.

The pulse conditions employed in the process of the present invention using STM are dependent upon the tip material employed. Preferred for use herein are polycrystalline tungsten tips. With this tip preferred pulse conditions are from about 8 to about 100 nanoseconds in width and from about 2 to about 16 volts in height for a square pulse, or from about 10 to about 20 microseconds in width (full width half maximum) and from about 2 to about 10 volts in height for a triangular pulse. Preferably the tip is within a distance of less than about 1 nm from the coated substrate or the coating during fabrication.

An inert atmosphere can be employed but is not required in the process of the present invention. The etching or writing can be conducted in an ambient atmosphere. Likewise, a reduced pressure atmosphere can be employed but is not required in the present invention. For example, a ultrahigh vacuum with a base pressure lower than $10^{-9}$ torr can be utilized for an appropriate polymer coating such as polyvinyl alcohol or hydroxypropylcellulose.

The processes of the present invention are useful for easily etching structures of less than 10 nm in diameter. Nanoscale structure fabrication is of use in the area of microelectronics for data storage, circuit elements preparation, preparation of masks, fabrication of transistor structures, fabrication of micromachines, and other similar applications.

The present invention further comprises such an improved process as described above wherein a coated conducting or semiconducting substrate for nanometer scale fabrication can easily be prepared by dipping the substrate into an aqueous solution of a rigid rod polymer. In particular, such a process is an improved process for nanometer scale structure fabrication using a technique involving application of a voltage pulse between a sharp tip or stylus and a conducting or semiconducting substrate wherein the improvement comprises 1) dipping a conducting or semiconducting substrate into an aqueous solution of a rigid rod polymer to deposit a coating of molecularly flat layers of the polymer on the substrate, 2) allowing the moisture level of the coated substrate to equilibrate with an enclosed atmosphere surrounding the tip and coated substrate, 3) ascertaining that equilibration is achieved by monitoring pulsing conditions to determine when such conditions become constant, and 4) applying a voltage pulse to the coated substrate to form a nanometer scale structure.

The rigid rod polymers used in this process self-assemble into ordered layers to deposit a coating of molecularly flat layers of polymer on the substrate surface. Examples of rigid rod polymers are well known to those skilled in the art, and include, but are not limited to, celluloses such as hydroxypropylcellulose, cellulose derivatives, polyamides such as Kevlar ®, and others. Preferred is deposition of hydroxypropyl-cellulose on a polycrystalline graphite to provide well defined molecularly flat layers on the substrate with a simple dipping motion.

The moisture level of the coated substrate is then equilibrated with an enclosed atmosphere surrounding the coated substrate and instrument tip, and achievement of such equilibration determined by when pulsing conditions become constant. A nanometer scale structure can then be fabricated by applying a voltage pulse to the coated substrate.

A further aspect of the present invention involves preparation of a nanometer scale structure wherein the structure can reside in the coating instead of in the underlying substrate. This improved process for nanometer scale structure fabrication using a technique involving application of a voltage pulse or current between a sharp tip or stylus and a conducting or semiconducting substrate has improvements comprising 1) dipping a conducting or semiconducting substrate into a solution of a rigid rod polymer to deposit a coating of molecularly flat layers of the polymer on the substrate, and 2) applying an increased tunneling current compared to an imaging current to the coated substrate prepared in step 1) to form a nanometer scale structure. The coating partially evaporates under the action of an electric current to form nanometer scale structures having clean edges in ultrahigh vacuum. A typical current used is about 6 nA when the coating thickness is about two molecular layers. Also, the structure resides in the coating instead of in the underlying substrate. Thus in this case the coating is in effect functioning not only as the tunneling medium, but also as the substrate. One advantage of these processes is that toxic solvents are not required to develop the structure rendering it especially useful for electron beam resist materials.

A further aspect of the present invention is a process for retaining moisture in a substrate in vacuum comprising coating the substrate with a water-soluble polymer by depositing said polymer on the surface of the substrate. The polymer can be deposited using the Langmuir Blodgett technique, molecular beam epitaxy, spin-coating, spray-coating, adding liquid dropwise, or dipping the substrate into a solution of the polymer as previously discussed. The water-soluble polymers defined above for use as coatings, and the substrates previously defined are suitable for use herein. Preferred polymers are polyvinyl alcohol, hydroxypropylcellulose, or other water-soluble polymers that can easily be coated onto the substrate by dipping the substrate into a solution of polymer. Preferred for use herein is a substrate of pyrolytic graphite. The coated substrate is then subjected to a vacuum. It has been found that the coating seals the moisture inside, even when the coating is in a vacuum of less than $5 \times 10^{-9}$ torr. This process is thus useful to provide a means of retaining moisture in the substrate for various future uses.

The following examples illustrate the present invention but are not intended to limit it in any manner.

EXAMPLE 1

One monolayer of a fluorocarbon polymer having the following repeating unit

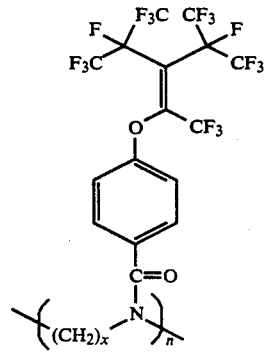

wherein n is an integer of at least 3, and x is an integer of 2 to 3, was deposited upon a highly oriented pyrolytic graphite surface as a Langmuir Blodgett film in a water trough. The coated sample was stored at ambient atmosphere. A structure was fabricated on the sample using the STM at the following conditions: tip bias voltage for imaging $= -0.09$ V, constant tunneling current$=0.5$ nA, triangular voltage pulse full width half maximum (FWHM) duration$=15$ microseconds, voltage pulse peak$=3.8$ V, duration of peak voltage$=1.5$ microseconds. A crater about 20 nm in diameter was created after using two consecutive pulses. The second pulse was necessary because the first pulse did not produce any response on the tunneling current indicating that no structure was formed. The coated sample was then left overnight in an enclosed atmosphere containing the sample and writing tip with an open beaker of water. The enclosure was then removed and the STM and sample were exposed to ambient atmosphere. Two separate pulses using the same conditions as described above except that the tip bias voltage for imaging was$= -0.01$ V were then applied to the tip, while tunneling at two different locations on the sample. The same area was then imaged in a constant current mode. Two holes of about 3 nm in extent were observed. The enclosure box was then put back on the STM with the beaker of water inside. The letter "U" was then written using the same voltage conditions as described above for a triangular voltage pulse FWHM of 15 microseconds, voltage pulse peak of 3.8 V, and duration of peak voltage of 1.5 microseconds. The writing was conducted by moving the tip to each appropriate location on the surface of the sample and applying a voltage pulse to the tip. The same area was imaged in the tunneling mode and a pattern in the form of a letter "U" was observed. Of 10 pulses put on the tip to form the letter, only one appeared to be ineffective in forming the nanostructure. The size of the letter "U" was 15 by 5 nm. Likewise the letter "D" was written and imaged. One out of 12 pulses used to form this letter appeared to be ineffective. The letter "D" formed was 10 by 6 nm.

EXAMPLE 2

A 1% solution of polyvinyl alcohol containing 10–15% polyvinyl acetate copolymer (molecular weight$=86000$) in distilled water was deposited on highly oriented pyrolytic graphite by dipping the graphite sample quickly into the solution. The coated sample was stored at 90° C. overnight. The coated sample was placed inside an enclosure that also housed the STM tip and a beaker of water for at least one hour. A tunneling current of 0.5 nA and voltage of $-0.076$ V were used. The voltage pulse width was 14 microseconds (full width half maximum) and the voltage pulse height used was 2.9 V. Voltage pulses as described gave structures that were smaller than 1.5 nm in extent and as small as 0.4 nm in extent. The success rate in making individual structures was about 75%. A second portion of the coated sample was exposed to ambient room air for about 9 days. The STM fabrication was then conducted without a beaker of water present. The voltage pulse settings used were as described above. The resulting fabricated structures were between 1.0 and 2.0 nm in extent. All of the structures made in this example had the appearance of mounds rather than holes.

EXAMPLE 3

One monolayer of polybutyl alcohol was deposited on highly oriented pyrolitic graphite as a Langmuir Blodgett film. The coated sample was placed in an enclosed atmosphere in the STM with a beaker of water. Equilibration with the ambient humidity required several days. To image a structure a tunneling current of 0.7 nA was used. After equilibration structures were fabricated using a voltage pulse width of 16 microseconds (full width half maximum) with a voltage pulse peak of 3.2 V. Each structure produced was between 2.0 and 4.0 nm in extent having the appearance of either mounds or holes.

EXAMPLE 4

The polyvinyl alcohol coated sample of Example 2 was placed in the STM housed in an ultrahigh vacuum chamber having a base pressure of less than $10^{-9}$ torr. To obtain this vacuum condition the chamber was baked at about 150° C. for at least 24 hours. The load-lock mechanism was such that the sample could be placed in the ultrahigh vacuum environment without being baked. The tunneling current employed to image structures had a tip bias voltage of about 0.8 V and a magnitude of 0.5 nA. The shape of the pulses were almost square. The pulse width was 12 microseconds and the pulse height was 5 to 6 V. The structures ranged from 1.0 to 3.0 nm in diameter, this experiment was continued for two days with no noticeable changes in pulse characteristics.

EXAMPLE 5

A coating of hydroxypropylcellulose (molecular weight=100,000) on graphite was prepared by dipping a freshly cleaved graphite sample into a 0.07% solution of hydroxypropylcellulose in distilled water for 90 seconds. The coated substrate was heated on a hot plate to 70° C. for 30 minutes. It was then mounted on a sample holder and was heated on the sample holder to 70° C. for another 30 minutes. The coated sample was then transferred to the STM in a ultrahigh vacuum chamber. Parallel bands about 100 nm wide separated by several hundred nm were observed. After bringing the tunneling current to 6 nA with the tip stationary (without scanning the tip) at the band, the original band with straight edges was found to show a large opening of about 200 nm wide at the mouth of the opening where the tunneling tip was located when the tunneling current was raised. The edges of the opening were clean to molecular scale. This indicated that this polymer formed a well-defined, molecularly flat layer that could be etched by a moderate electrical current to form patterns with clean edges. The tunneling bias voltage on the tip was 1.0 V and the tunneling current used for imaging was 0.4 nA.

EXAMPLE 6

A coating of hydroxypropylcellulose on graphite was prepared by dipping a freshly cleaved graphite sample into a 0.07% solution of hydroxypropyl cellulose/distilled water solution for 60 seconds. The coated sample was air-dried for two weeks in the STM operating in ambient atmosphere. Molecularly flat terraces with straight step edges were observed. When the tip was positioned on one of the terraces, the tunneling current was raised from 0.3 nA, which was the imaging current, to 6 nA for 60 seconds. The subsequent scan of the same area showed a depression about 7.5 nm in diameter with rough edges. The tunneling bias used was −0.8 V.

EXAMPLE 7

Using the coated sample of Example 5, holes about 5 nm in diameter were obtained when a square pulse of 8 V and 8 nanoseconds was applied to the tunneling tip at a previously flat area on the sample in ultrahigh vacuum of less than $5 \times 10^{-9}$ torr. In areas where the coating was thicker (5 to 10 nm) square voltage pulses 8 nanoseconds wide and 10 V high on the tunneling tip created a different type of structure. Each dot structure created by each pulse was made up of a collection of smaller dots. The dimension of the structure was 20–40 nm. The letter "O" was written with 8 structures with a 100% success rate. The tunneling bias voltage was 1 V and the current was 0.3 nA.

EXAMPLE 8

Figure 6:
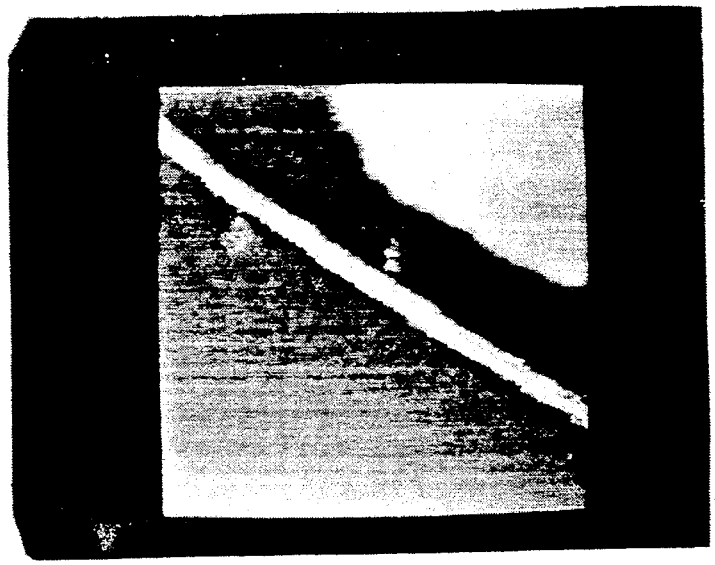
FIG. 6 depicts 3 nanometer dot structures, each on different parts of a substrate surface having polymer layers of different thicknesses as fabricated in Example 8.
Figure 7:
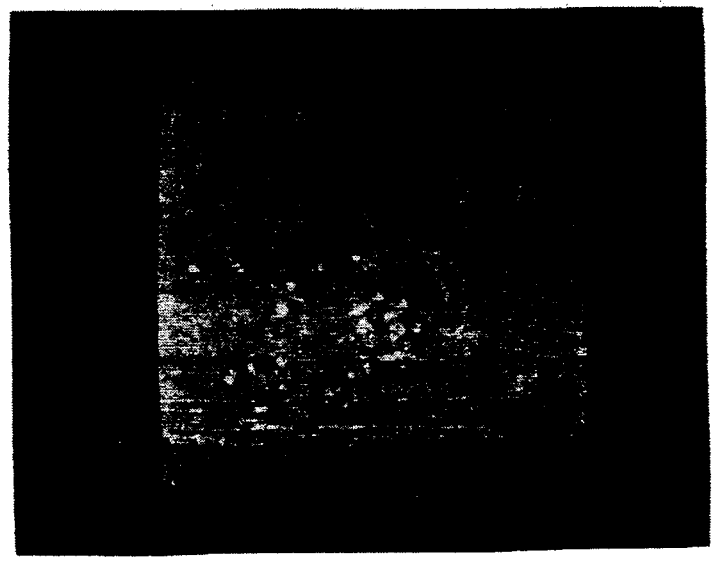
FIG. 7 depicts the letter "J" and the Greek letter "β" fabricated with square pulses in Example 8.
Figure 8:
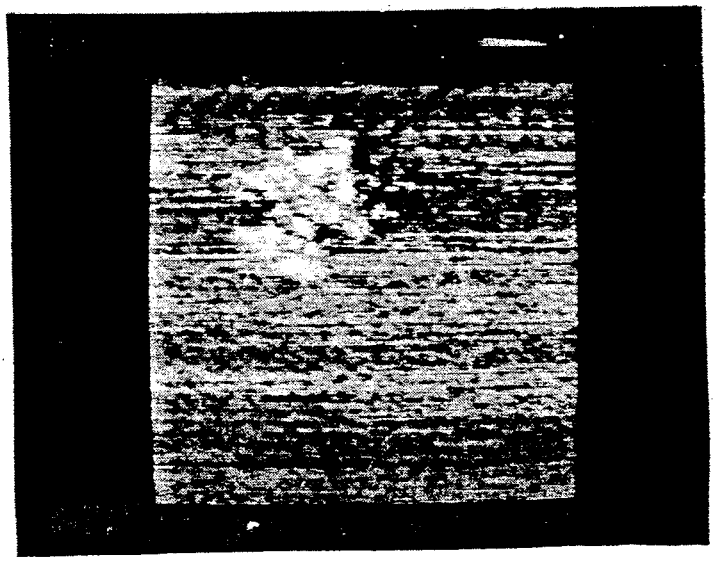
FIG. 8 depicts the letter "J" and the Greek letter "β" fabricated with triangular pulses in Example 8.

A coating of hydroxypropylcellulose on polycrystalline graphite was prepared by dipping a freshly cleaved sample of graphite into a 0.07% solution of hydroxypropylcellulose (molecular weight=100,000) in distilled water. The coated sample was left to equilibrate with the ambient atmosphere in the STM enclosure for 2 weeks. The coating formed was of apparently molecularly flat terraces of different thicknesses. Using triangular pulses of pulse width=14 microseconds (full width half maximum) and a pulse height of 2.7 V, mounds of about 3 nm in diameter were fabricated on different terraces on the sample. The thickness of the terrace layers did not affect either the structure size and shape or the voltage pulse conditions to generate them. FIG. 6 shows three such structures fabricated with the above voltage pulse conditions. The white area of the figure appeared to be about 0.5 to about 1 nm higher than the remainder of the surface. The capital letter "J" and the Greek letter "β" were written on a flat area of the sample. The two letters were contained in an 8 nm by 8 nm area. The total number of pulses applied was 25. Twenty-three mound structures of about 2 nm diameter each were identified from these two letters. The pulsing conditions were: triangular pulse width, 15 microseconds (full width half maximum), pulse height=2.95 V. The imaging conditions were: tip bias voltage=−0.8 V, and tunneling current=0.3 nA. The resulting structure is shown in FIG. 8. The same two letters were written again with square pulses on another area of the sample. The pulse conditions were 8 nanoseconds pulse width and 12 V pulse height. The area containing the two letters was 50 nm by 35 nm. The diameter of each mound or hole was about 3 to 4 nm. The success rate of fabricating these structures was essentially 100%. The tip bias voltage for imaging was −0.8 V and the tunneling current was 0.3 nA. The resulting structure is shown in FIG. 7.

What is claimed is:

1. An improved process for nanometer scale structure fabrication using a technique involving application of a voltage pulse between a sharp tip and a conducting or semiconducting substrate wherein the improvement comprises
   1) depositing a nonconducting polymer coating on the surface of a conducting or semiconducting substrate,
   2) allowing the moisture level of the polymer coating and the substrate to equilibrate with an enclosed atmosphere surrounding the tip and the coated substrate, and 3) ascertaining that equilibration is achieved by monitoring pulsing conditions to determine when such conditions become constant, prior to commencing fabrication of a structure on the substrate.

2. The process of claim 1 wherein the technique comprises scanning tunneling microscopy.

3. The process of claim 1 wherein the polymer coating is less than about 100 nm in thickness.

4. The process of claim 1 wherein the tip is within a distance of less than about 1 nm from the coated substrate or the coating during fabrication.

5. The process of claim 1 wherein the substrate comprises graphite, gold, metallic glass, superconductors, magnetic media, metal chalcogenides, or phase change materials.

6. The process of claim 1 wherein the substrate comprises graphite.

7. The process of claim 1 wherein the polymeric coating comprises a fluorocarbon polymer, polyalkyl alcohol, polyvinyl alcohol, cyanoethyl polymers, polysilanes, polydienes, celluloses, polystyrenes, polyurethane, Teflon ® or a water soluble polymer.

8. The process of claim 7 wherein the polymeric coating comprises a fluorocarbon polymer.

9. The process of claim 7 wherein the polymeric coating is polyvinyl alcohol.

10. The process of claim 6 wherein the polymeric coating is hydroxypropylcellulose.

11. The process of claim 10 wherein the fabricated structure resides in the polymeric coating.

12. The process of claim 1 wherein the fabricated structure has a diameter of less than about 10 nm.

13. The process of claim 1 wherein the humidity of the enclosed atmosphere is at least about 60% at room temperature.

14. The process of claim 1 wherein the polymer is deposited as a Langmuir Blodgett film as a single monolayer or multilayers.

15. The process of claim 1 wherein the pulsing conditions employed are triangular pulses of about 1 to about 20 microseconds duration, or square pulses of about 8 to about 100 nanoseconds duration.

16. An improved process for nanometer scale structure fabrication using a technique involving application of a voltage pulse between a sharp tip or stylus and a conducting or semiconducting substrate wherein the improvement comprises 1) dipping a conducting or semiconducting substrate into an aqueous solution of a rigid rod polymer to deposit a coating of molecularly flat layers of the polymer on the substrate, 2) allowing the moisture level of the coated substrate to equilibrate with an enclosed atmosphere surrounding the tip and the coated substrate, 3) ascertaining that equilibration is achieved by monitoring pulsing conditions to determine when such conditions become constant, and 4) applying a voltage pulse to the coated substrate to form a nanometer scale structure.

17. An improved process for nanometer scale structure fabrication using a technique involving application of a voltage pulse or current between a sharp tip or stylus and a conducting or semiconducting substrate wherein the improvement comprises 1) dipping a conducting or semiconducting substrate into a solution of a rigid rod polymer to deposit a coating of molecularly flat layers of the polymer on the substrate, and 2) applying an increased tunneling current compared to an imaging current to the coated substrate to form a nanoscale structure.

18. The process of claim 16 or 17 wherein the technique comprises scanning tunneling microscopy.

19. The process of claim 16 or 17 wherein the cellulose coating is less than about 100 nm in thickness.

20. The process of claim 16 or 17 wherein the substrate comprises graphite, gold, metallic glass, superconductors, magnetic media, metal chalcogenides, or phase change materials.

21. The process of claim 20 wherein the substrate comprises graphite.

22. The process of claim 16 or 17 wherein the polymeric coating comprises a water-soluble rigid rod polymer.

23. The process of claim 22 wherein the polymeric coating comprises hydroxypropylcellulose.

24. The process of claim 17 wherein the structure resides in the polymeric coating.

25. The process of claim 16 or 17 wherein the nanoscale structure has a diameter of less than about 30 nm.

* * * * *